United States Patent [19]

Shimano

[11] 4,430,800
[45] Feb. 14, 1984

[54] DETECTING DEVICE FOR THE NUMBER OF ROTATION OF A WHEEL AT A BICYCLE

[75] Inventor: Keizo Shimano, Sakai, Japan

[73] Assignee: Shimano Industrial Company Limited, Osaka, Japan

[21] Appl. No.: 321,898

[22] Filed: Nov. 16, 1981

[30] Foreign Application Priority Data

Nov. 29, 1980 [JP] Japan ............................ 55-171527[U]

[51] Int. Cl.³ .............................................. G01B 3/12
[52] U.S. Cl. .................................. 33/141 E; 235/95 R
[58] Field of Search ............ 308/192; 235/95 R, 95 B, 235/96, 97; 33/141, 141.5, 142

[56] References Cited

U.S. PATENT DOCUMENTS

| | | | |
|---|---|---|---|
| 656,476 | 8/1900 | Rockwell | 235/95 R |
| 2,761,986 | 9/1956 | Wald et al. | 33/134 R X |
| 2,772,832 | 12/1956 | Lassiter | 33/142 X |
| 3,858,942 | 1/1975 | Humlong | 308/192 X |
| 4,308,665 | 1/1982 | Losch | 33/141 E |

FOREIGN PATENT DOCUMENTS

| | | |
|---|---|---|
| 551625 | 7/1974 | Switzerland . |
| 211086 | 2/1924 | United Kingdom . |
| 2034047 | 5/1980 | United Kingdom . |

Primary Examiner—Harry N. Haroian
Attorney, Agent, or Firm—Stevens, Davis, Miller & Mosher

[57] ABSTRACT

A detecting device for detecting the number of rotations of a wheel at a bicycle, comprises a fixing member fixed to a hub shaft and a rotary member fixed to a hub shell supported rotatably to the hub shaft, the fixing member being opposite and close to the rotary member, so that at the opposite portions therebetween are provided a detecting element and actuators, the actuators operating said detecting element to thereby provide a detection of the number of rotations of the wheel by use of rotations of the hub shell.

8 Claims, 5 Drawing Figures

DETECTING DEVICE FOR THE NUMBER OF ROTATION OF A WHEEL AT A BICYCLE

FIELD OF THE INVENTION

This invention relates to a detecting device for detecting the number of rotations of a wheel at a bicycle, and more particularly to a detecting device which utilizes rotations of a wheel hub to electrically detect the number of rotations of the wheel.

BACKGROUND OF THE INVENTION

Generally, the number of rotations of the wheel at the bicycle is detected mechanically by use of a tire or rim of the wheel. In other words, a drive unit is driven by the tire or rim of the wheel to transmit rotations thereof to a meter through a flexible wire, the meter indicating the number of rotations of the wheel.

Therefore, the drive unit detecting rotations of the wheel and the flexible wire connecting the drive unit and meter, are complex in construction and take much time to assemble. Also, a rotational resistance occurs between the drive unit and the wheel and requires an extra driving force for the bicycle's running, noises is and noises are generated.

SUMMARY OF THE INVENTION

A main object of the invention is to provide a detecting device for detecting the number of rotations of the wheel at the bicycle, which device is simple in construction, easy to assemble, and free from a rotational resistance generated between the wheel and the conventional drive unit, thereby enabling a driver to drive the bicycle in comfort.

Another object of the invention is to provide a detecting device which accurately detects the number of rotations of the wheel.

The present invention is directed to electrical detection of the number of rotations of the wheel of the bicycle by use of a hub shaft and a hub shell of a wheel hub. The hub shaft is fixed to the bicycle frame, the hub shell is supported rotatably to the hub shaft, and bearings are provided for rotatably supporting the hub shell. The detecting device of the invention is provided with a fixing member fixed to the hub shaft and a rotary member fixed to the hub shell and rotatable together therewith. The fixing member is opposite in close proximity to the rotary member, and at the opposite surfaces of both members are provided a detecting element mainly comprising a reed switch and actuators to render the detecting element electrically operative, so that the number of rotations of the wheel can be detected from rotations of the hub shell.

Accordingly, the detecting device of the invention, which detects the number of rotations of a wheel by use of the hub, has a simple construction and is easy to assemble. Also, the detection is performable only by electrically operating the detecting element through the actuator. As a result, the electrical detection is accurate as no frictional resistance is applied to the rotary member, and in turn to the hub shell.

This invention includes a fixing member which is integral with the hub shaft and a fixing member separate therefrom and fixed thereto, and further includes a rotary member which is integral with the hub shell, as well as one which is separate therefrom and fixed thereto.

The above and other related objects and features of the invention will be apparent from a reading of the following description in accordance with the accompanying drawings.

DETAILED DESCRIPTION OF THE INVENTION

Figure 1:
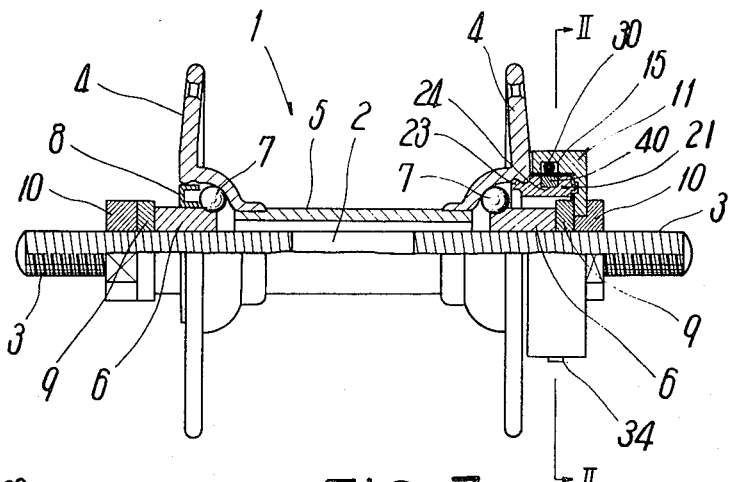
FIG. 1 is a partially cutaway front view of an embodiment of a detecting device of the invention, which is assembled in a wheel hub at the bicycle.

Referring to FIG. 1, reference numeral 1 generally designates a front wheel hub of a bicycle. The hub 1 is so constructed that a hub shell 5 having at both axial ends hub flanges 4 fixed thereto, is sleeved onto a hub shaft 2 having screw threads 3 at both axial end portions, and balls 7 are interposed between the inner surface of each hub flange 4 and each ball holder 6 inserted onto the hub shaft 2, the hub shell 5 being supported rotatably with respect to the hub shaft 2. Reference numeral 8 designates a sealing member, and 9 and 10 designate lock nuts screwed with the hub shaft 2 to fix the ball holders 6.

Figure 2:
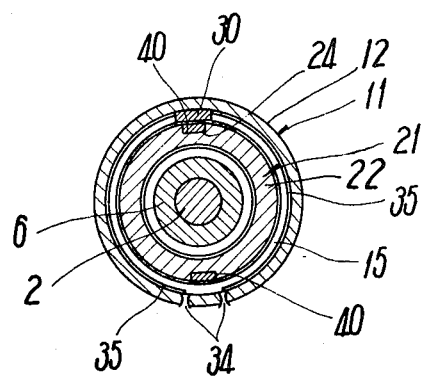
FIG. 2 is a sectional view taken on the line II—II in FIG. 1.

A detecting device of the invention utilizes the wheel hub 1 constructed as foregoing to thereby detect the number of rotations of the wheel, and is constructed as shown in FIGS. 1 and 2.

A fixing member 11 separate from the hub shaft 2 is fixed thereto, and comprises a cylindrical body 12 and a wall 13 closing one axial end of body 12 to be bottomed-cylinder-shaped, the closing wall 13 having at the center a bore 14 larger in diameter than the hub shaft 2 and being sandwiched between the lock nuts 9 and 10 screwed with one axial end of the hub shaft 2, or between the ball holder 6 and the lock nut 10 therefor (not shown), so that the lock nuts 9 and 10 are screwably tightened to fix the fixing member 11 to the hub shaft 3.

A rotary member 21 is separate from but fixed to the hub shell 5 and is rotatable together therewith, and comprises a cylindrical body 22 and a mounting cone 23, the cylindrical body 22 having an outer diameter smaller than an inner diameter of the cylindrical body 12 at the fixing member 11, the mounting cone 23 being formed at one axial end of body 22 and adapted to be fitted to the inner periphery of hub flange 4 axially outwardly from the ball race thereof, thereby fixing the rotary member 21 to the hub shell 5.

The inner periphery of body 12 at the fixing member 11 is opposite to and in close proximity with the outer periphery of body 22 at the rotary member 21. An annular recess 15 is provided at the inner periphery of body 12, and recesses 24 opposite to the annular recess 15 are provided at the outer periphery of body 22, the annular recess 15 holding therein a reed switch detecting element 30, the recesses 24 holding two magnet actuators 40 for electrically actuating the reed switch.

Figure 4:
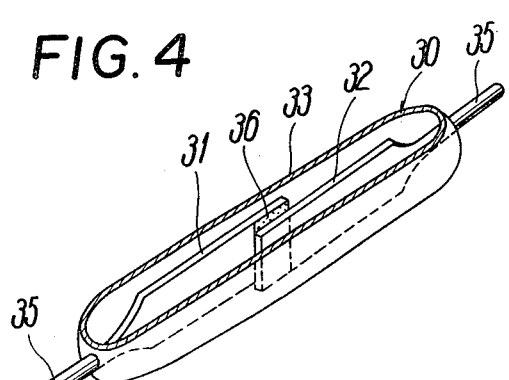
FIG. 4 is a partially cutaway perspective view of a reed switch.

The reed switch 30, as shown in FIG. 4, has a pair of reeds 31 and 32 which are housed within a glass tube 33 which connects at both lengthwise ends thereof with lead wires 35 having connectors 34 respectively, the lead wires 35 being placed within the annular recess 15 at the inner periphery of body 12 at the fixing member 11. Alternatively, printed wirings or a wire-printed plate, instead of the lead wires, may be provided at the fixing member 11, resulting in a low manufacturing cost due to saving the lead wires.

In the detecting device of the invention constructed as the above, the rotary member 21 fixed to the hub shell 5 rotates together therewith following rotations of the wheel, so that the actuators 40 rotate to render electrically operativie the reed switch 30 or detecting element at the fixing member 11, thereby performing the electrical detection of the number of rotations of the bicycle wheel.

In other words, the reeds 31 and 32 are switched at the contacts thereof as the actuators or magnets 40 rotate, so that the detecting element or reed switch 30, when the contacts are closed, is energized to output a pulse signal, the number of pulses being read to thereby detect the number of rotations of the wheel.

Figure 5:
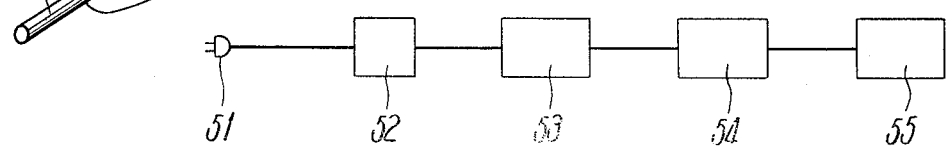
FIG. 5 is a block diagram of an example of the use of the detecting device of the invention.

The detecting device of the invention is connected to, for example, an electrical indicating device as shown in FIG. 5, thereby displaying, for example, the bicycle speed. The indicating device comprises an amplifier 52 having a plug 51 connecting with the connectors 34, an analog-digital convertor 53, a microcomputer 54, and a display unit 55. The pulse signal, when given to the microcomputer 54 through analog-digital convertor 53, is digital-converted and then displayed as the bicycle speed by the display unit 55.

Alternatively, the fixing member 11 may be integral with the hub shaft 2. Or, the ball holder 6 or the lock nut 9 may be utilized as the fixing member 11. Also, the rotary member 21 may be integral with the hub shell 5. Or, the hub shell 5 may be utilized as the rotary member 21.

The reed switch used as the detecting element 30 is preferably held by the fixing member 11, but it may be held by the rotary member 21, and the actuators 40 by the fixing member.

Also, the reed switch alternatively may be supported to a base plate held in the recess 15.

Furthermore, the actuator 40 and detecting element 30 alternatively may employ other instruments, such as a photosensor.

In the construction shown in FIG. 1, the open end of cylindrical body 12 at the fixing member 11 is kept opposite and close to the axially outer surface of hub flange 4, so that the fixing member 11 can be used as a sealing member for the bearing construction supporting the hub shell 5.

Figure 3:
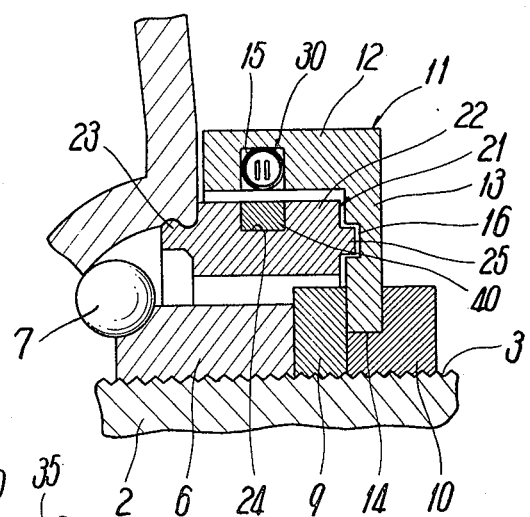
FIG. 3 is an enlarged sectional view of a principal portion of the detecting device in FIG. 1.

In this instance, an annular groove 16 is provided at the closing wall 13 and an annular projection 25 is provided at the axially outer end face of cylindrical body 22 as shown in FIGS. 1 and 3, the projection 25 being fitted into the annular groove 16, thereby improving the sealing effect for the bearing. In addition, the annular groove 16 and projection 25, even when arranged reversely to the above, are similarly effective in sealing the bearing.

As seen from the above, the detecting device of the invention has a fixing member and a rotary member which are disposed close to each other and a detecting element and actuators provided at the opposite surfaces of both members, with the actuators rendering the detecting element electrically operative, so that the number of rotations of the bicycle wheel can be detected by use of rotations of the hub shell. The structure is simple in construction and subjected to no frictional resistance between the rotary member and the fixing member. Also, the electrical detection by the detecting device is accurate.

While a preferred embodiment of the invention has been described using specific terms, such description is for illustrative purpose only, and it is to be understood that changes and variations may be made without departing from the spirit or scope of the invention which is defined by the following claims.

What is claimed is:

1. A detecting device for detecting the number of rotations of a bicycle wheel having a hub shaft fixed to a bicycle frame, a hub shell which is supported rotatably to said hub shaft and has a pair of flanges, and a pair of bearing members for rotatably supporting said hub shell, said detecting device comprising a fixing member separate from but fixed to said hub shaft and a rotary member fixed to said hub shell and rotating together therewith, said fixing member being positioned in close proximity to said rotary member, each of said fixing member and rotary member comprising cylindrical bodies and having respective opposing circumferential peripheral surfaces in close proximity to one another and radially outwardly of said hub shaft, one of said opposing peripheral surfaces containing a detecting element having a changeable electrical state and the other of said opposing peripheral surfaces containing actuators for changing the electrical state of said detecting element, so that the number of rotations of said wheel can be detected by rotations of said hub shell.

2. A detecting device for detecting the number of rotations of a bicycle wheel according to claim 1, wherein said fixing member comprises a cylindrical body and a closing wall which closes said body at one lengthwise end thereof, said closing wall having at the central portion thereof a center bore larger in diameter than said hub shaft and being fixed thereto.

3. A detecting device for detecting the number of rotations of a bicycle wheel according to claim 2, wherein a fixing means for said closing wall is a lock nut which fixes one of said bearing members.

4. A detecting device for detecting the number of rotations of a bicycle wheel according to claim 2, wherein said fixing member, at an end face of said cylindrical body at a side of the open end thereof, is opposite and close to the outer surface of one of said flanges at said hub shell and serves as a sealing member for one of said bearing members which support said hub shell.

5. A detecting device for detecting the number of rotations of a bicycle wheel according to one of claims 2 or 4, wherein the cylindrical body of said rotary member has an outer diameter smaller than an inner diameter of said cylindrical body of said fixing member, the outer periphery of said rotary member bieng opposite to the inner periphery of said fixing member.

6. A detecting device for detecting the number of rotations of a bicycle wheel according to claim 4, wherein an annular groove is provided at one of said closing wall of said fixing member and an end face of said rotary member opposite to said closing wall, and an annular projection to enter said annular groove is provided at the other.

7. A detecting device for detecting the number of rotations of a bicycle wheel according to claim 4, wherein said cylindrical body of said fixing member has at its inner periphery said detecting element and said rotary member has at its outer periphery said actuators.

8. A detecting device for detecting the number of rotations of a bicycle wheel according to any one of claims 1, 2 or 7, wherein said detecting element is a reed switch and said actuators are magnets.

* * * * *